(12) United States Patent
Berglund et al.

(10) Patent No.: US 6,777,617 B2
(45) Date of Patent: Aug. 17, 2004

(54) TELECOMMUNICATIONS TERMINAL

(75) Inventors: Sidney J. Berglund, Round Rock, TX (US); Rutesh D. Parikh, Austin, TX (US); Shirley E. Overfield, Cedar Park, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/331,969

(22) Filed: Dec. 30, 2002

(65) Prior Publication Data

US 2004/0123998 A1 Jul. 1, 2004

(51) Int. Cl.[7] .............................................. H02G 3/00
(52) U.S. Cl. ................................... 174/92; 174/138 F
(58) Field of Search ............................. 174/92, 41, 60, 174/88 R, 138 F; 385/134, 135

(56) References Cited

U.S. PATENT DOCUMENTS

| | | |
|---|---|---|
| 3,836,696 A | 9/1974 | Gressitt et al. |
| 4,390,744 A | 6/1983 | Suffi et al. |
| 4,414,426 A | 11/1983 | Burtelson |
| 4,513,171 A | 4/1985 | Suffi et al. |
| 4,535,197 A | 8/1985 | Butler |
| 4,536,611 A | 8/1985 | Butler |
| 4,605,815 A | 8/1986 | Wilson |
| 4,647,715 A | 3/1987 | Butler |
| 4,694,118 A | 9/1987 | Schmidt |
| 4,857,672 A | 8/1989 | Rebers et al. |
| 4,992,627 A | 2/1991 | Mullaney |
| 5,247,135 A | 9/1993 | Rebers et al. |
| 6,166,331 A | * 12/2000 | Sjolinder et al. .............. 174/98 |

OTHER PUBLICATIONS

J.D. Kraus, Antennas (2d ed. 1998, McGraw–Hill, Inc., New York).

* cited by examiner

Primary Examiner—Chau N. Nguyen
(74) Attorney, Agent, or Firm—James J. Trussell

(57) ABSTRACT

A terminal for use with telecommunication cables has a splice closure and a terminal closure joined to the splice closure. The splice closure encloses opened areas of the cable, while the terminal closure encloses a connection device for establishing connection between telecommunication lines in the splice closure and a drop line. In various embodiments, a frame is mounted within the splice closure for retaining non-spliced lines of the telecommunication cable away from spliced lines; a storage member is located within the terminal closure for retaining excess lengths of the drop line; a drop line strain relief bracket is mounted within the terminal closure; and a memory device is incorporated into the terminal for storing information about the terminal.

38 Claims, 12 Drawing Sheets

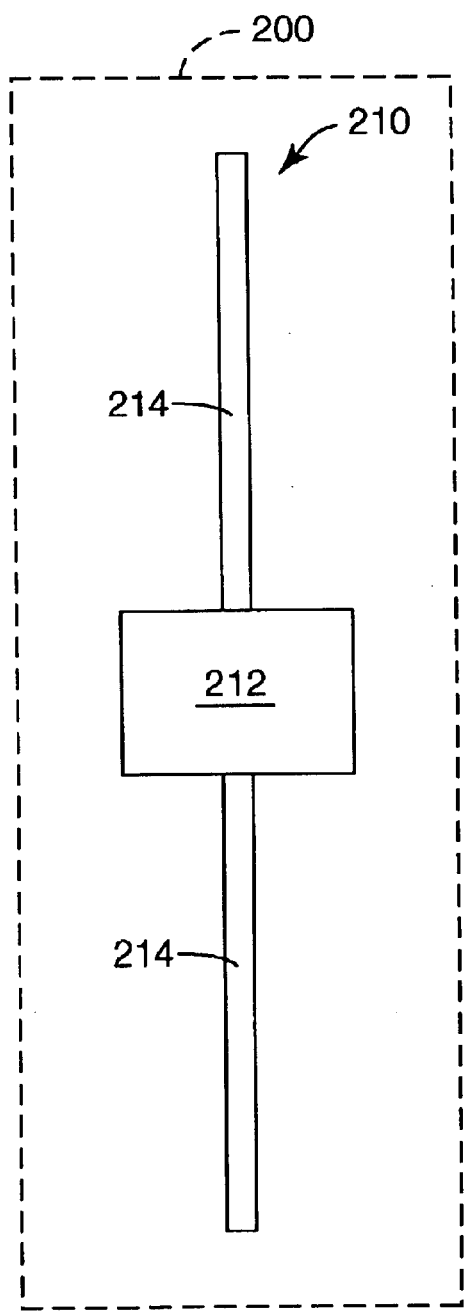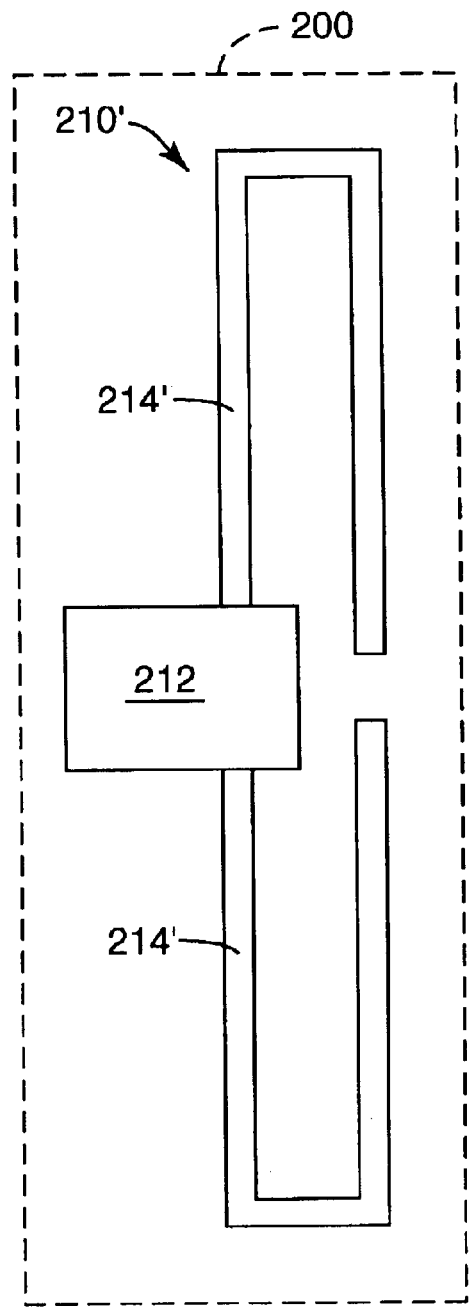
Fig. 10A  Fig. 10B

TELECOMMUNICATIONS TERMINAL

THE FIELD OF THE INVENTION

The present invention generally relates to terminals for telecommunication cables. More particularly, the present invention relates to a versatile, unitary splice closure and drop wire closure as used in the telecommunication industry.

BACKGROUND OF THE INVENTION

Telecommunication cables are ubiquitous and used for distributing all manner of data across vast networks. The majority of telecommunication cables are electrically conductive cables (typically copper), although the use of fiber optic cables is growing rapidly as larger and larger amounts of data are transmitted. As telecommunication cables are routed across networks, it is necessary to periodically open the cable and splice or tap into the cable so that data may be distributed to "branches" of the network. The branches may be further distributed until the network reaches individual homes, businesses, offices, and so on. The distributed lines are often referred to as drop lines or distribution lines. At each point where the cable is opened, it is necessary to provide some type of closure to protect the cable. Preferably, the closure allows easy and repeated access to the cable, such that technicians may easily access the cable to provide any necessary services.

Cable terminals having a cable closure and associated terminal box for connecting drop wires to the cable are generally known. Examples of these patents are U.S. Pat. Nos. 3,836,696; 4,390,744; 4,535,197; 4,536,611; 4,605,815; 4,647,715; and 4,694,118. Each of these terminals has a cable closure and a terminal box for connecting drop wires at the same location where a cable is opened, such as at a cable splice.

There are other terminal boxes that are separate from the cable closure and are designed to hang from the cable closure or from an adjacent support structure, such as a support strand in the case of an aerial cable. Examples of these are U.S. Pat. Nos. 4,414,426; 4,513,171; and 4,992,627.

The above-mentioned patents describe cable terminals which are generally heavy and complicated to construct and use. U.S. Pat. No. 5,247,135 improves upon the prior art and provides a cable terminal having a joined cable closure and terminal box that is strong and lightweight. Although possessing advantages over the prior art, this structure, like the prior art, is intended for use with electrically conductive telecommunications cables. It is not generally suitable for use with fiber optic cables, which have different constructions and performance concerns than electrically conductive cables. For example, optical fibers used in fiber optic cables are susceptible to decreased performance or even breakage if they are bent beyond their minimum bend radius. Additionally, optical fibers and their connections (whether a splice, a connector, or other connection device) are more sensitive to their physical handling and the presence of debris such as dust, moisture, and the like.

A cable terminal that is strong, lightweight, easy to access, and addresses the particular needs and demands of fiber optic cables while also being useable for electrically conductive telecommunication cables is highly desirable.

SUMMARY OF THE INVENTION

A terminal for use with telecommunication cables having a plurality of telecommunication lines is described herein. The terminal is useable for both electrically conductive and fiber optic telecommunication cables. The terminal includes a splice closure and a terminal closure joined to the splice closure. The splice closure encloses opened areas of the cable, while the terminal closure encloses a connection device for establishing connection between telecommunication lines in the splice closure and a drop line.

In one embodiment, a frame is mounted within the splice closure. The frame has a retention member for retaining non-spliced lines of the telecommunication cable away from spliced lines. In another embodiment, a storage member is located within the terminal closure for retaining excess lengths of the drop line. In yet another embodiment, a strain relief bracket is mounted within the terminal closure for connection to the drop line. In yet another embodiment, a memory device is incorporated into the terminal for storing information about the terminal.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

FIGS. 10A and 10B are schematic illustrations of radio frequency identification devices.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
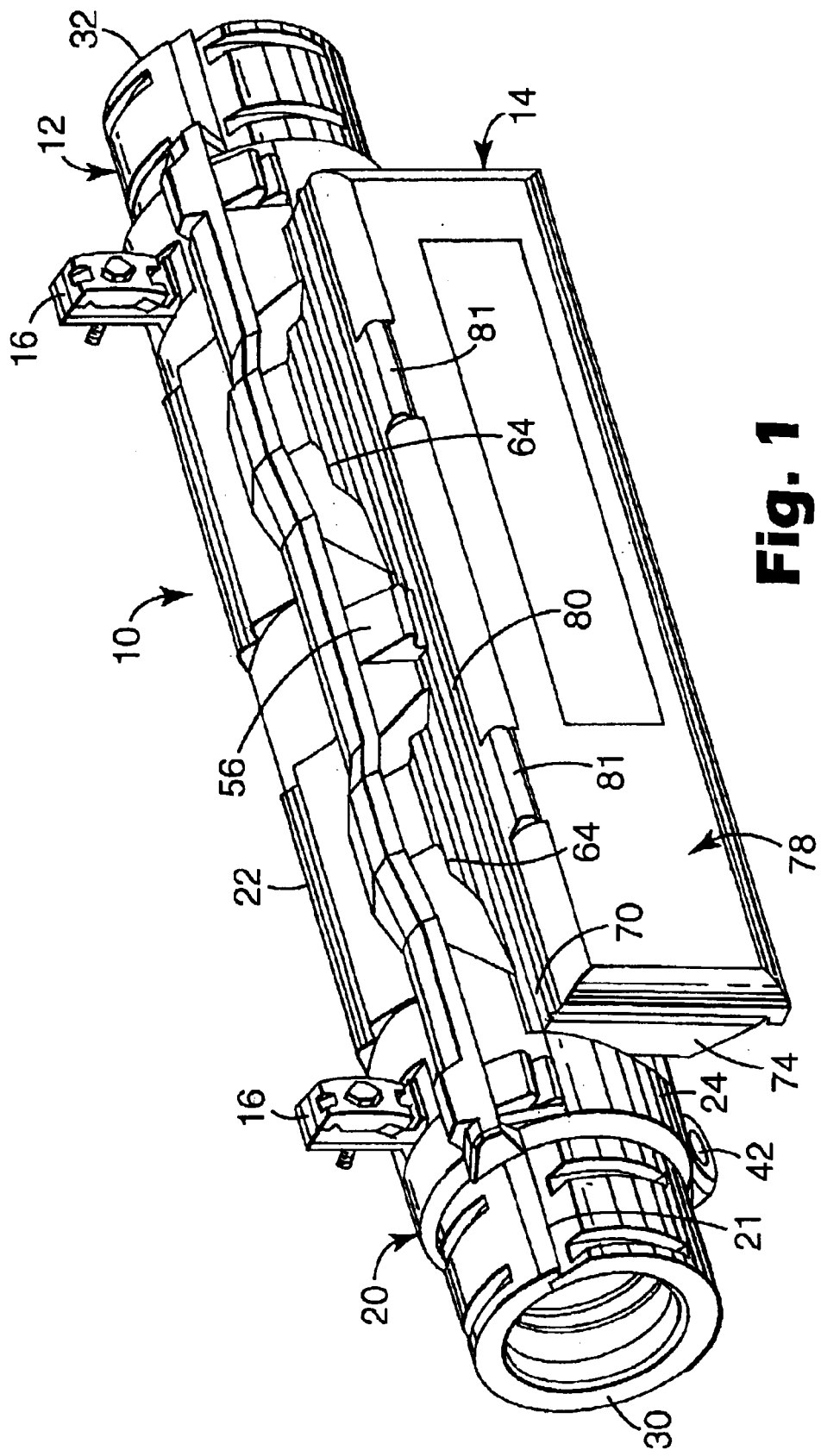
FIG. 1 is a perspective view of one embodiment of a terminal according to the invention.
Figure 2:
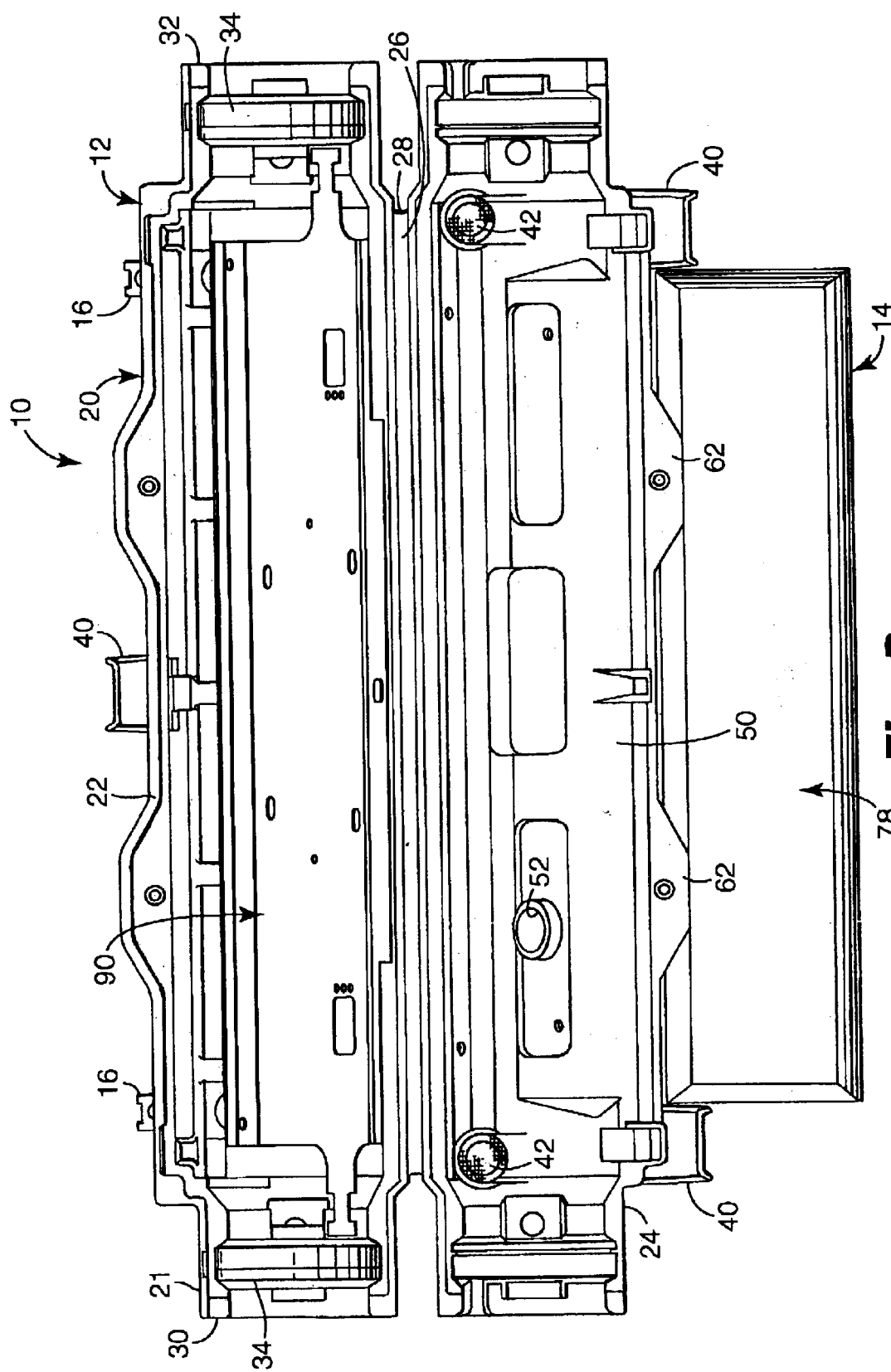
FIG. 2 is a side view of the terminal of FIG. 1 showing the splice closure in an open position.

Referring to FIGS. 1 and 2, terminal 10 comprises an integral splice closure 12 and a terminal closure 14. Terminal 10 may be adapted to be suspended from a support cable (not shown) by means of a pair of hangers 16.

Splice closure 12 comprises a casing 20 which may be opened along an edge or opening seam 21, having mating ridges and grooves to form a labyrinth-type seal for restricting the ingress of dirt, water, bugs, and the like, into casing 20. Generally, casing 20 comprises first and second casing sections 22, 24 that are rotatably connected to one another along a hinge line 26. In one embodiment according to the invention, hinge line 26 is defined by a compression molded hinge 28. That is, hinge 28 is integral with casing sections 22, 24. Preferably, casing 20 is molded from a suitable polymer material, such as polyethylene or the like. In this manner, hinge 28 may be integrally formed with casing sections 22, 24 when casing 20 is molded. According to the present invention, casing 20 may be made by any conventional molding technique, such as blow molding, injection molding, and the like. Each section 22, 24 is approximately one half of casing 20. That is, each of sections 22, 24 is substantially semi-cylindrical in configuration.

As seen in FIG. 1, casing 20 has an elongated, substantially cylindrical shape with first and second opposite ends 30, 32. End seals 34 (best seen in FIG. 2) are disposed at first and second ends 30, 32 for receiving and sealing around cables (not shown) entering casing 20 at first and second ends 30, 32. The cylindrical casing 20 is maintained and secured in a closed condition by latch or fastening device 40. Fastening device 40 may be any of a variety of conventional arrangements whereby section 22 may be selectively secured to section 24 along seam 21. In the embodiment shown in FIGS. 1 and 2, fastening device 40 includes an actuator handle and securing latch forming a toggle latch. Thus, casing 20 may be readily closed and opened, as desired, to provide access to an interior of casing 20.

Figure 4:
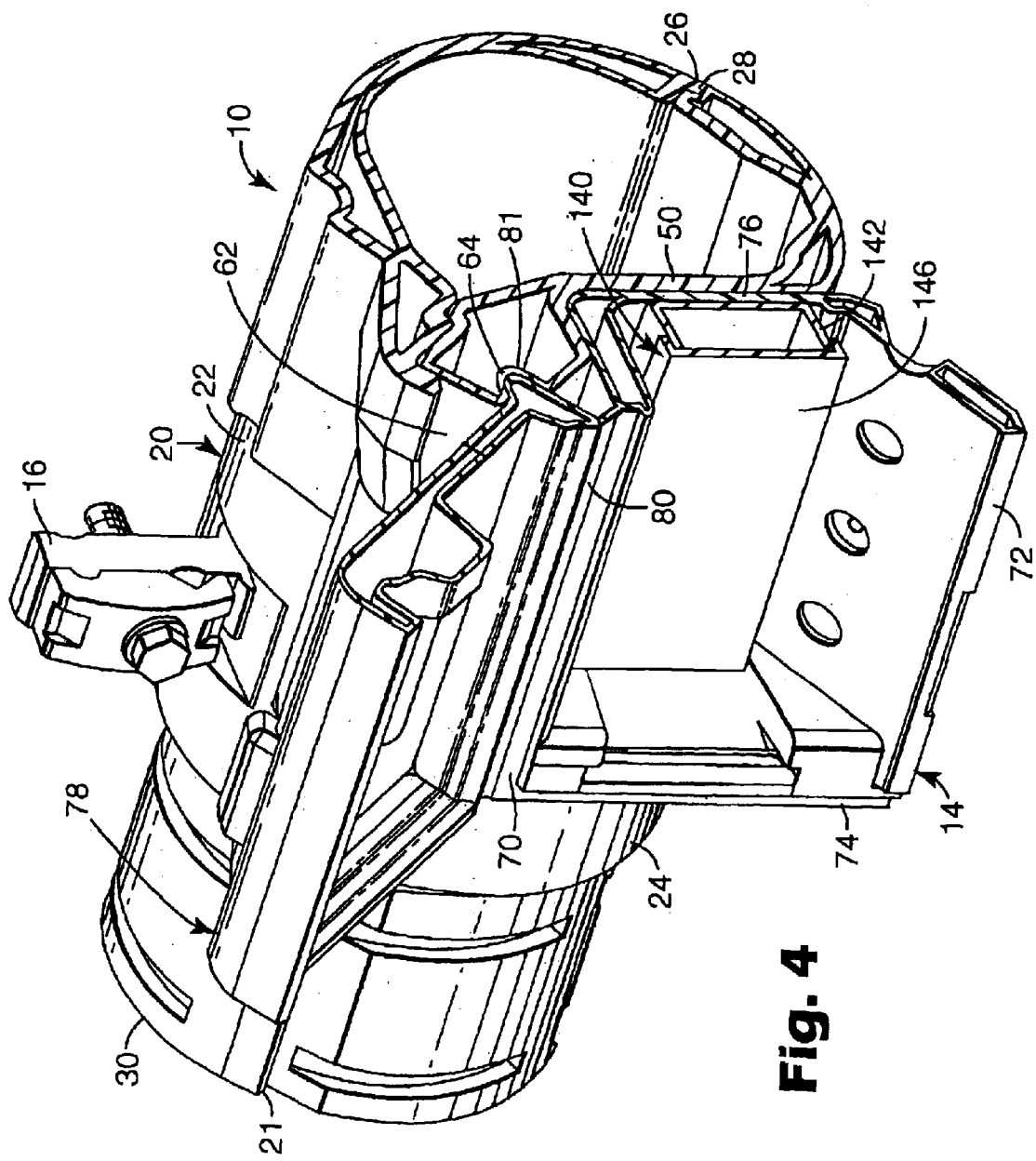
FIG. 4 is a perspective cross-sectional view of the terminal of FIG. 3.
Figure 5:
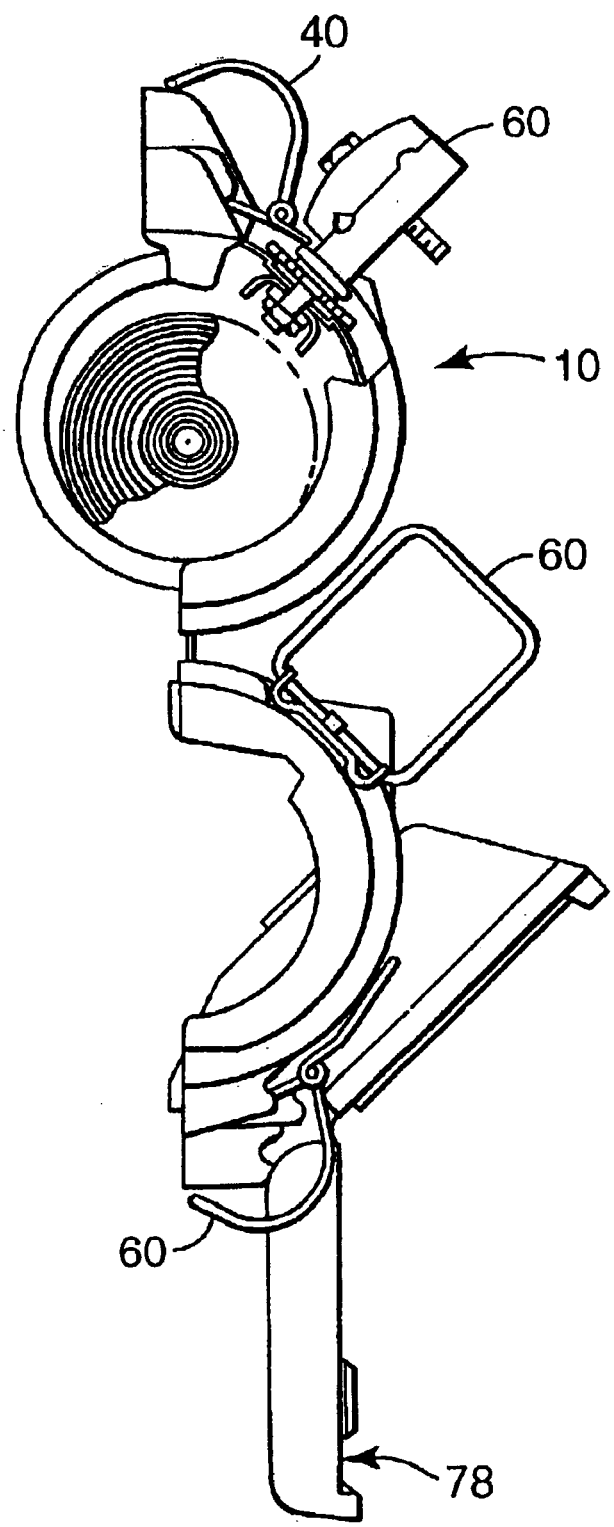
FIG. 5 is an end view of the terminal taken along line 5—5 in FIG. 2, showing the splice closure in an open position and the terminal closure in an open position.

As will be apparent by examination of FIGS. 1 and 4, access to the enclosed splice area within casing 20 is facilitated by the rotational position of first casing section 22 (in the upper position) relative to second casing section 24 (in the lower position). In particular, first and second sections 22, 24 of casing 20 are oriented such that when casing 20 is opened, a substantially unobstructed view is provided into the splice area inside casing 20. This is accomplished by preferred positioning of hinge line 26 relative to the location of hangers 16. In one embodiment, hinge line 26 is positioned between about 125° to 145°, and preferably about 135°, from attachment points of hangers 16 for mounting the terminal 10 to a support cable (not shown).

In FIG. 2, splice closure 12 is depicted with casing 20 in the open position. End seals 34, which may be formed according U.S. Pat. No. 4,857,672, assigned to assignee of this application, are supported in recesses in first and second ends 30, 32 of section 22 such that end seals 34, upon receiving a cable therethrough, are retained adjacent first and second ends 30, 32, respectively. End seals 34 are engaged and sealed by cooperating recessed areas at the first and second ends 30, 32 of section 24 when the sections 22, 24 are in the closed position.

Section 24 of casing 20 includes openings 42 which form drains in the lower portion of casing 20. Openings 42 may be screen covered and include filtering means to limit the ingress of dirt, water, bugs, and the like, into casing 20.

Casing 20 also includes a support surface 50 for joining to and supporting thereon terminal closure 14. Support surface 50 is generally flat, inside and outside of casing 20.

Support surface 50 is formed with a plurality of openings 52 through which telecommunication lines, such as fiber optic cables or copper wires may pass from splice closure 12 into terminal closure 14. Support surface 50 is positioned to be located on a side of casing 20 below opening seam 21, such that the terminal closure 14 supported thereon is readily accessible from the side or front of terminal 10. Splice closure 12 further includes the fastening device 40, and in the embodiment of FIG. 2 fastening device 40 is supported on section 22 of casing 20 such that the latch portion of fastening device 40 may engage a boss 56 on section 24 above support surface 50. Further, section 24 optionally supports on its outer surfaces a plurality of drop wire strain relieve brackets 60 which support drop wires (not shown) entering terminal closure 14. Adjacent opening seam 21 in the outer wall of casing 20 are projections 62 with concave portions defining recesses 64. Recesses 64 are formed for receiving lid 78 of terminal closure 14 when it is desired to have access to the interior of terminal closure 14 as will be described.

Terminal closure 14 is joined to casing 20 at the support surface 50 by any suitable means to make splice closure 12 and terminal closure 14 a unitary structure. If splice closure 12 and terminal closure 14 are first formed as separate unites, suitable means for making splice closure 12 and terminal closure 14 a unitary structure include, for example, joining splice closure 12 and terminal closure 14 using pop rivets, machine screws, bolts, heat welding, sonic welding, and the like. Splice closure 12 and terminal closure 14 may alternately be joined to form a unitary structure by molding the closures 12, 14 together as a single structure, rather than first forming them as separate units.

The support surface 50 is positioned to place terminal closure 14 on a side of casing 20 when terminal 10 is suspended from a support cable (not shown). Terminal closure 14 comprises a top wall 70, a bottom wall 72, end walls 74, 75, back wall 76 and a lid 78. Lid 78 is hinged to top wall 70 of terminal closure 14 and is preferably hinged by a compression molded hinge 80. That is, hinge 80 is integral with top wall 70 and lid 78 of terminal closure 14. The terminal closure 14 may be molded from a suitable polymer material, such as polyethylene or the like. In this manner, hinge 80 can be readily formed integrally with the walls and lid of terminal closure 14 when molded. Terminal closure 14 may be formed by any conventional molding technique, such as by blow molding, injection molding, and the like.

Lid 78 is provided with detents 81 on its outer surface adjacent hinge 80. Detents 81 cooperate with recesses 64 in casing 20 to maintain lid 78 in an open and raised position when lid 78 is raised sufficiently by, for example, a service technician working on the contents of terminal closure 14. The flexibility of the polymer material forming splice closure 12 and terminal closure 14 is sufficient to permit detent 81 to enter recesses 64 and thereby secure lid 78 in the raised open position. Lid 78 and bottom wall 72 have cooperating latches 82, 84 to hold lid 78 in a closed position.

In use, terminal 10 will be used to enclose a telecommunication cable at points where the cable is "spliced into" for distribution of a signal to one or more locations. It should be noted that the phrase "spliced into" as used herein is understood and intended to include any way in which a signal in a telecommunication cable is routed away from the cable for distribution to one or more locations. In practice, the telecommunication cable may be spliced, split, tapped, coupled, and the like. For example, a telecommunication cable may contain a plurality of data lines. At a predetermined point, the cable is spliced into and signals from one or more of the plurality of data lines are routed from the main cable. This may occur, as an example, in a telephone network in which a primary or "trunk" telecommunication cable is routed though an area, and periodically one or more individual data lines are distributed to "branches" of the network. The branches may be further distributed until the network reaches individual homes, businesses, offices, and so on. The distributed lines are often referred to as drop lines or distribution lines.

In the example of a fiber optic telecommunication cable, the cable may contain a plurality of buffer tubes, with each buffer tube containing a plurality of individual optical fibers. At various points along the cable, it may be desired to branch off optical fibers of one or more buffer tubes, but not all of the optical fibers in the cable. The individual optical fibers of a buffer tube may be spliced directly to a corresponding drop line, or the individual optical fibers may be split, such as by using a splitter or coupler, so that the signals in a single fiber are distributed to more than one drop line. At this point, it should be noted that although terminal 10 is described herein primarily as used with fiber optic telecommunication cables, terminal 10 may be used with telecommunication cables in general, including electrically conductive (i.e., copper) cables, and terminal 10 is not limited to use with fiber optic cables. Each type of telecommunication cable has corresponding devices and methods for routing a signal away from the cable to a drop line, and each of those devices and methods are understood and intended to be included in references to "splices" and "splicing into."

Figure 6:
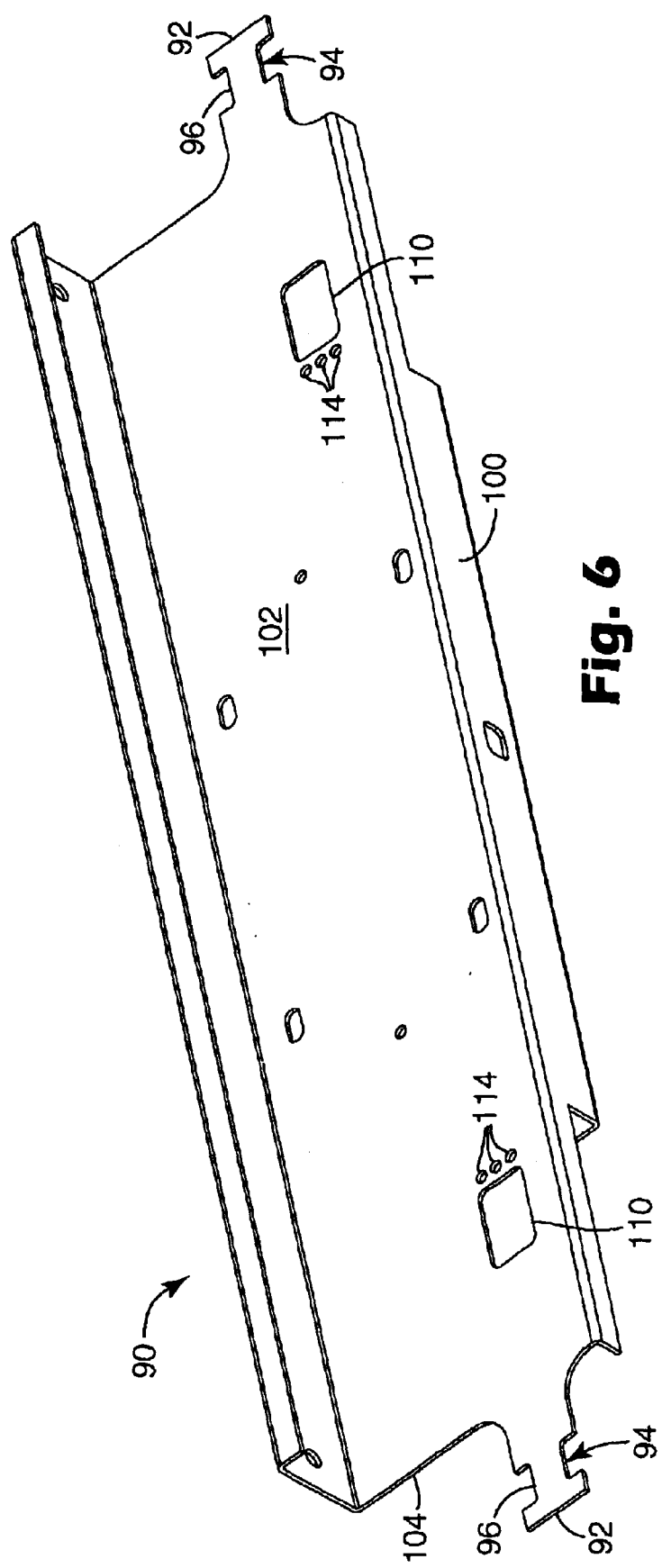
FIG. 6 is a perspective view of the splice closure frame.

As best seen in FIGS. 2 and 6, a frame 90 is mounted within splice closure 12. Frame 90 is secured within splice enclosure 12 using suitable fastening device such as, for example, pop rivets, machine screws, bolts, and the like. Alternately, frame 90 may be over molded by splice closure 12, such that other fastening devices are not required to secure frame 90 within splice closure 12. Mounting brackets 92 are provided adjacent first and second ends 30, 32 of splice closure 12 for attachment to a telecommunication cable (not shown). In one embodiment, mounting brackets 92 include strain relief features 94 for attachment to a strength member of the telecommunication cable. In the embodiment illustrated in FIGS. 2 and 6, strain relief features 94 include recessed areas 96 for engaging, for example, a cable clamp or tie securing the telecommunication cable and its strength member.

As noted above, in many applications only a fraction of the plurality of data lines in the telecommunication cable will be spliced into. For ease of use, it is desirable to separate those data lines which are to be spliced into from those data lines which simply pass through terminal 10. Frame 90 includes a retention member 100 for retaining non-spliced data lines of a telecommunication cable away from spliced data lines of a telecommunication cable within the splice closure 12. In particular, retention member 100 maintains spliced lines adjacent a first side 102 of the frame 90 and non-spliced lines adjacent a second side 104 of frame 90 opposite first side 102.

To aid in separating spliced lines from non-spliced lines, frame 90 includes an isolation port 110 for directing the spliced lines to first side 102 of frame 90 and non-spliced lines to second side 104. In the exemplary use of terminal 10 with a fiber optic cable, one or more buffer tubes having therein optical fibers to be spliced or tapped into may be routed through isolation port 110 to first side 102 of frame 90, while other buffer tubes of the cable remain adjacent to the second side 104 of frame 90. Openings 114 are provided in frame 90 adjacent isolation port 110 so that data lines routed through isolation port 110 may be secured to frame 90, such as by cable clamps, cable ties or the like.

Figure 7:
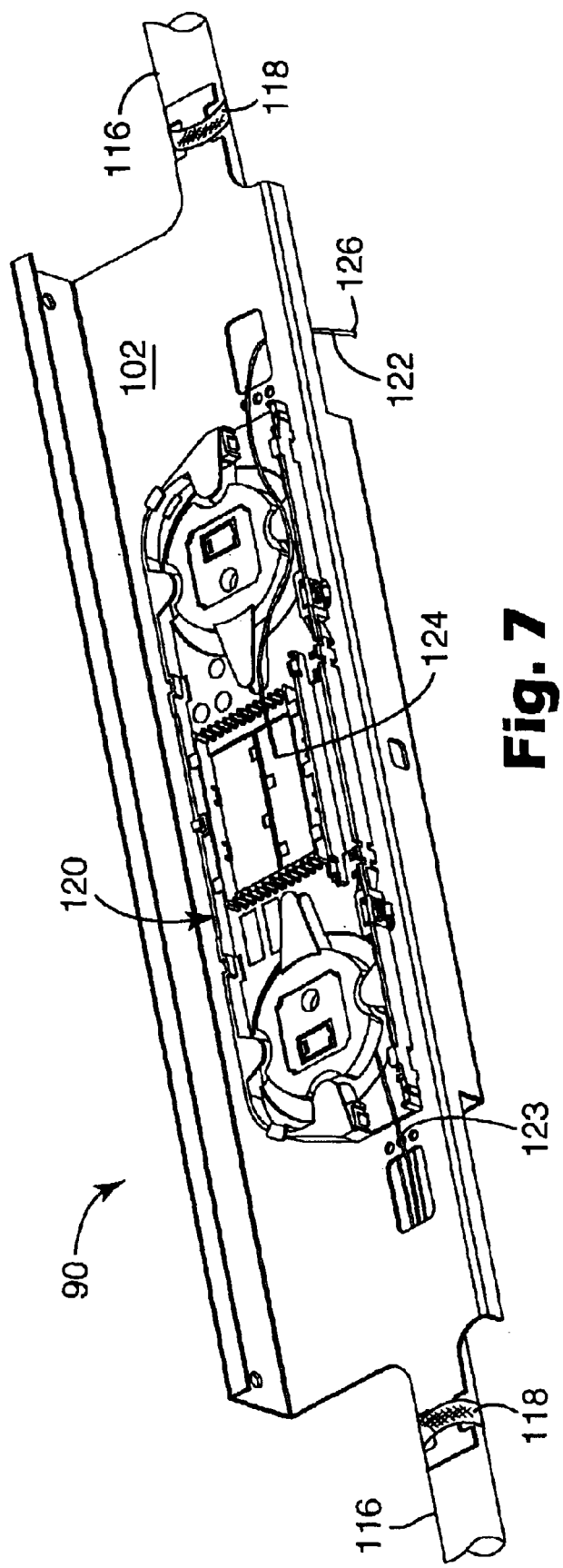
FIG. 7 is a perspective view of the splice closure frame of FIG. 6 illustrating its use with a fiber optic cable and splice tray.

FIG. 7 illustrates frame 90 secured to a telecommunication cable 116 using cable clamps 118 as described above. (Splice closure 12 is not shown). Frame 90 is provided on its first side 102 with a splice tray 120 having communication lines 122 for connection to separated data lines 123 of the telecommunication cable 116. The communication lines 122 may be, for example, a preterminated pigtail ready at a first end 124 for splicing with the separated data lines 123 of telecommunication cable 116 at splice tray 120, and ready at a second end 126 for connection with one or more drop lines (not shown) in terminal closure 14.

Figure 3:
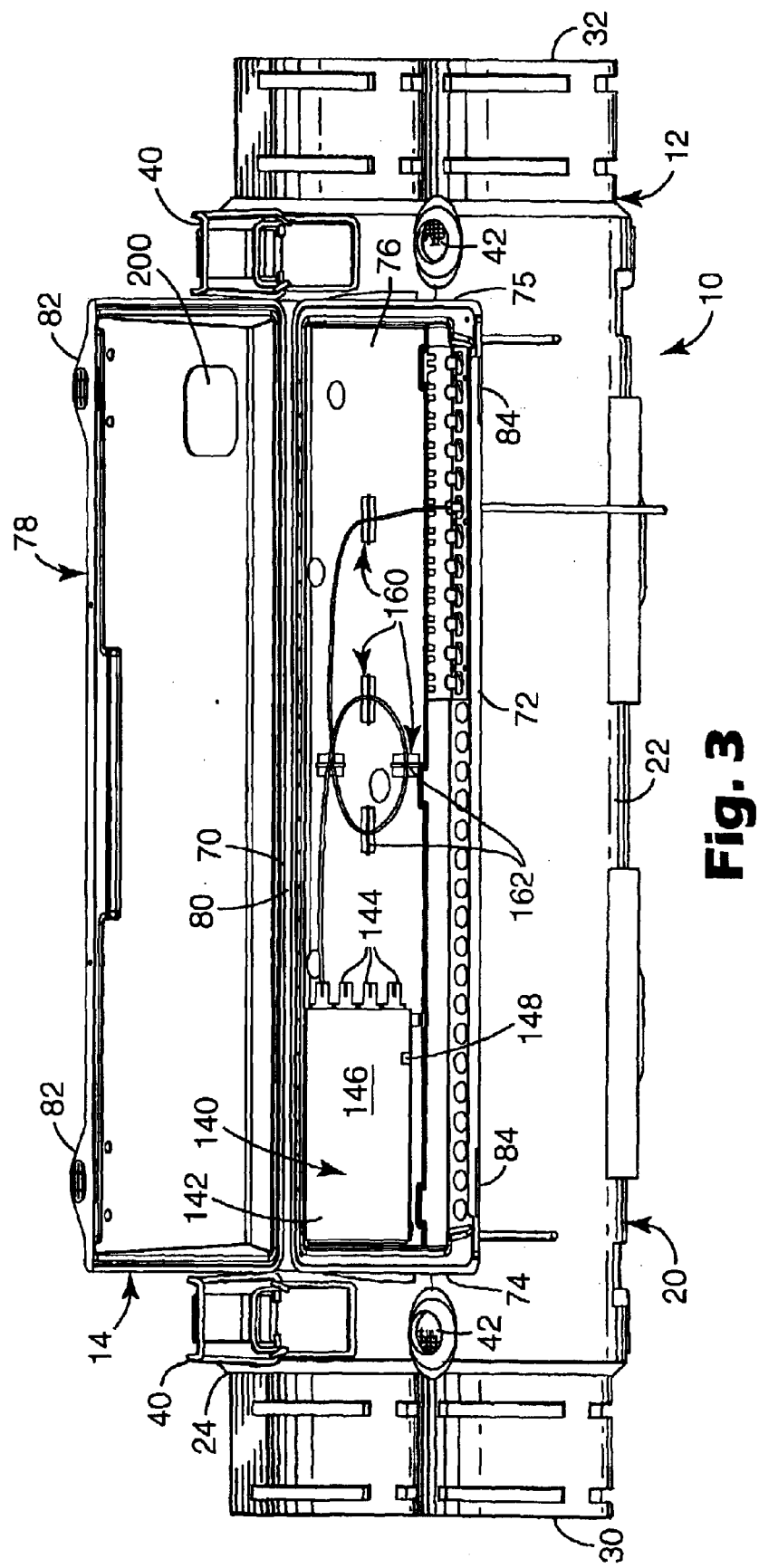
FIG. 3 is a side view of the terminal of FIG. 1 showing the terminal closure in an open position.

After one or more of the separated data lines 123 of the telecommunication cable 116 have been spliced into, the communication lines 122 are routed through one or more opening 52 into terminal closure 14 (FIGS. 2 and 3). Within terminal closure 14, a connection device 140 is provided for establishing connection between the spliced telecommunication lines in the splice closure and one or more drop lines (not shown) extending outside of the terminal closure 14.

In one embodiment according to the invention, and as illustrated in FIG. 3, connection device 140 is a patch panel 142 having a plurality of connectors 144. In the exemplary use of terminal 10 with a fiber optic cable, each connector 144 of patch panel 142 may terminate an individual optical fiber of the cable. Those skilled in the art will recognize that connectors 144 may be any suitable connector. For example, connectors 144 may be SC, ST, FC or LC connectors, and may be, for example, either positive contact (PC) or angled polished connector (APC) types of connectors. Preferably, patch panel 142 has a lid 146 which may be opened to allow access to the back sides of the plurality of connectors 144 (such as may be required for cleaning). However, lid 146 is preferably securable such that access to the back sides of the plurality of connectors 144 is limited to authorized users only. In this manner, the integrity of connectors 144 may be maintained. Patch panel 142 also includes at least one drainage hole 148 for egress of any condensation that may accumulate in the patch panel 142. To aid in drainage of any condensation that may form within or on patch panel 142, the surfaces of patch panel 142 are preferably hydrophobic. The surfaces may be made hydrophobic by applying a hydrophobic coating, by forming patch panel 142 from a hydrophobic material, or by providing the surfaces with a hydrophobic surface texture (such as micro-replicated features which prevent beading or accumulation of water).

Figure 8A:
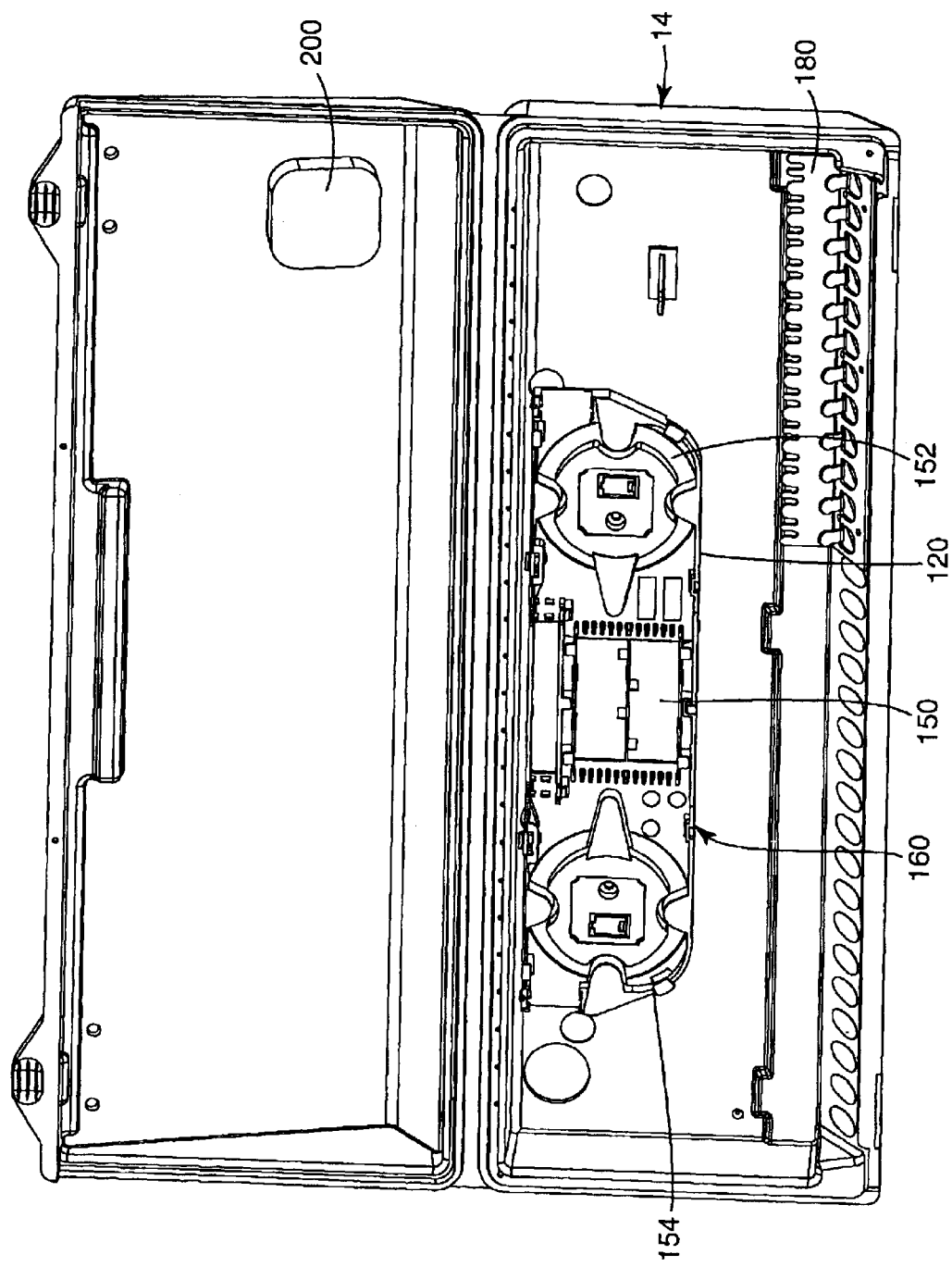
FIG. 8a is an illustration of an alternate embodiment of the storage member in the terminal closure.

In one embodiment according to the invention, as illustrated in FIG. 8a (in which splice closure 12 is not shown), connection device 140 in terminal closure 14 may be, for example, one or more splices, rather than the patch panel 142 and connectors 144 as illustrated in FIG. 3. In the embodiment of FIG. 8a, splices can be held or stored in a splice tray 120 like that shown on frame 90 in FIG. 7 for use in splice closure 12. The splice tray 120 may be secured within terminal closure 14 in any suitable manner. In addition to holding the actual splice connections in storage area 150, the splice tray 120 advantageously also provides storage area 152 for retaining excess lengths of the drop line and storage area 154 for retaining excess lengths of a communication line extending between the splice closure 12 and the terminal closure 14.

From connection device 140, a drop line carries the spliced or tapped data line outside of the terminal closure 14. In currently available terminals, excess lengths of drop lines are often stored outside of the terminal. Such external storage has numerous disadvantages: the excess lengths may not be conveniently stored close to the terminal where they are needed; the excess lengths are subject to damage by the environment or by people working near the terminal; the storage is often unsightly (such as coiled lines hanging from a support wire); and space for storage may not be readily available outside of the terminal.

In the terminal 10 described herein, a storage member 160 is provided within terminal closure 14 for retaining excess lengths of the drop line within terminal closure 10. As noted above, when a splice tray 120 is used in terminal closure 14, the splice tray also provides storage areas 152, 154 for retaining excess lengths of the drop line and for retaining excess lengths of a communication line extending between the splice closure and the terminal closure.

In the embodiment illustrated in FIG. 3, storage member 160 comprises at least one fastener 162 that may be used to secure excess lengths of the drop lines in an organized manner. Preferably, a plurality of fasteners are provided, such that movement and shifting of excess lengths is reduced. In one embodiment, fastener 162 is reclosable, such that fastener 162 may be repeatedly opened and closed as excess lengths of the drop lines are used or installed. In another embodiment, when used with fiber optic telecommunication cables and drop lines, storage member 160 and fasteners 162 are sized and positioned such that the fiber bend radius is controlled, so that the minimum bend radius of the optical fiber is not violated.

Figure 8B:
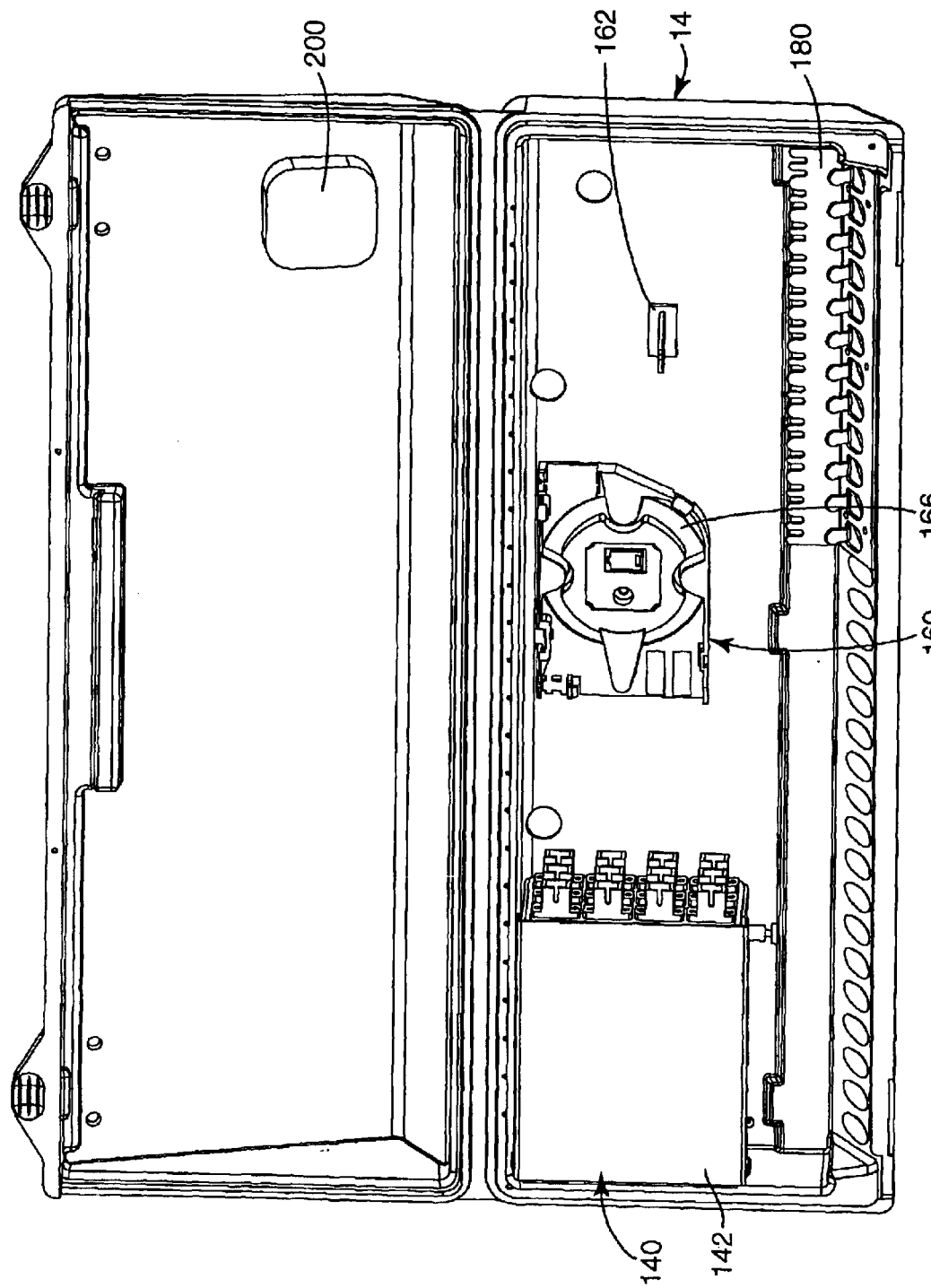
FIG. 8b is an illustration of another alternate embodiment of the storage member in the terminal closure.

In yet another embodiment, as shown in FIG. 8b, storage member 160 is an enclosable tray 166 which separates excess lengths of the drop lines from connection device 140 (patch panel 142 in this example) and protects them from damage. Tray 166 may be similar in appearance to the storage spools in storage areas 152, 154 of splice tray 120 (FIG. 8a), having areas in which excess lengths of the drop lines may be coiled. Tray 166 may be positioned on a movable storage platform, such that it can be lifted from or rotated within terminal closure 14 to permit complete and free access to the drop lines.

Figure 9:
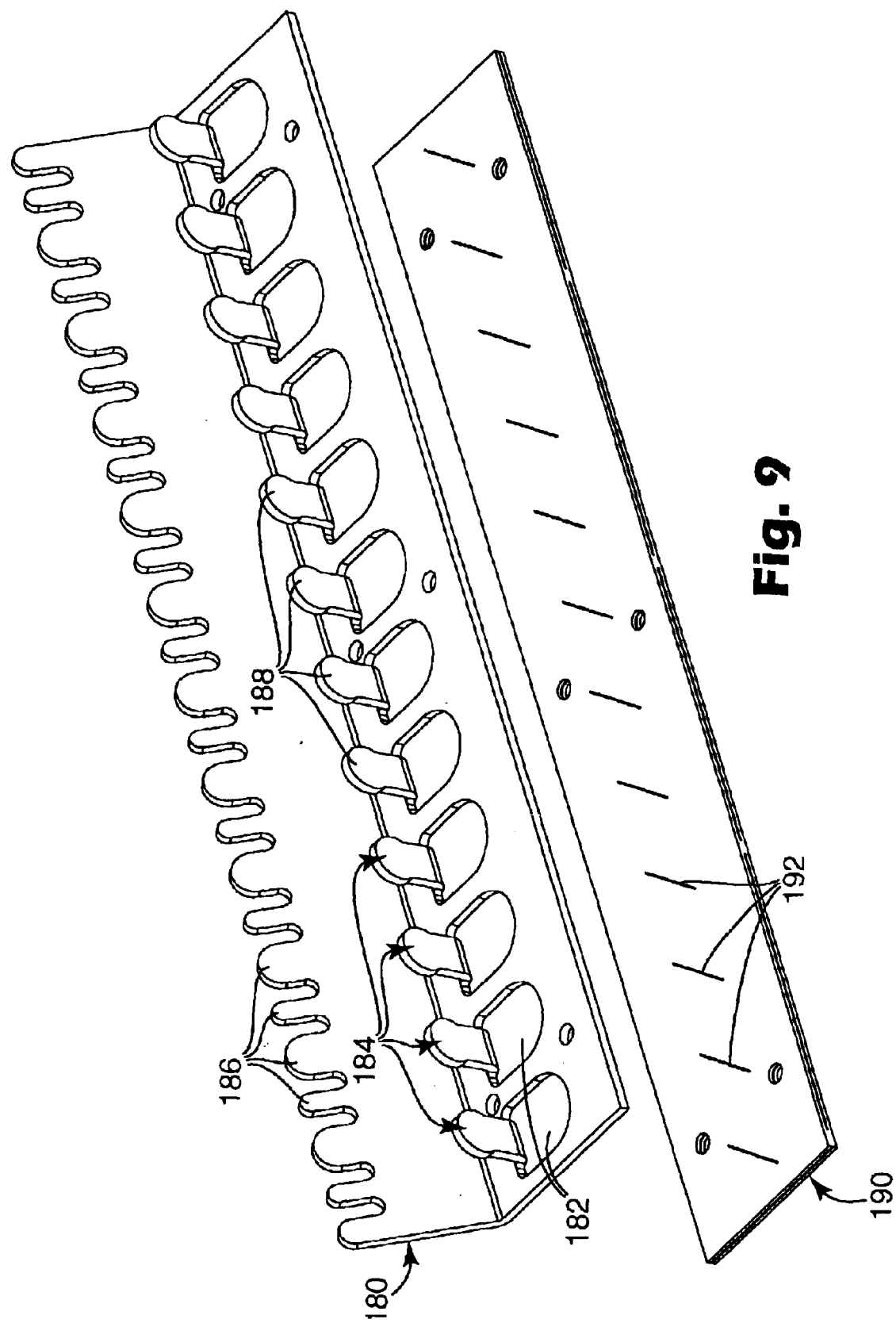
FIG. 9 is a perspective view of the strain relief bracket in the terminal closure.

A strain relief bracket 180, best seen in FIGS. 3 and 9, is provided within terminal closure 14 for connection to the drop lines as they exit terminal closure 14. Strain relief bracket 180 includes a plurality of openings 182 for allowing passage of drop lines outside of terminal closure 14. Strain relief bracket 180 further includes first strain relief members 184 for attachment to an exterior sheath of a drop line, and second strain relief members 186 for attachment to a strength member of the drop line.

First strain relief members 184 are positioned to be aligned with openings 182 and thus the drop lines as they exit terminal closure 14, such that a fastening member such as a cable clamp, cable tie or the like may be secured around the drop line and the first strain relief member 184. First strain relief members 184 preferably have an enlarged head portion 188, such that the fastening member securing the drop line to the first strain relief member 184 provides strain relief in both axial directions of the drop line. That is, first strain relief members 184 prevent the drop line from being pulled out of or pushed into terminal closure 14.

The shape and positioning of second strain relief members 186 depends upon the type of drop lines used, and in particular depends upon whether the drop lines include a strength member and the type of any strength member. If the strength members are relatively rigid, then second strain relief members 186 may be shaped and used similar to first strain relief members 184 as described above. If the strength members are flexible, as for example, an aramid fiber strength member, then the strength members may be simply looped and tied onto second strain relief members 186. As illustrated in FIG. 9, second strain relief members 186 form a comb on which flexible strength members may be looped and tied.

A sealing member 190 is provided in conjunction with strain relief bracket 180. Sealing member 190 surrounds and seals around each drop line as it extends outside of terminal closure 14. As shown in FIG. 9, sealing member 190 may be provided as a separate flexible and resilient strip having a plurality of slits 192. Each slit 192 is aligned with an opening 182 in strain relief bracket 180 and allows passage of a drop line. Although each slit 192 is shown as a single linear slit, any number of various shapes, sizes and orientations of each slit may be used, as is appropriate to provide sealing around the drop line. Sealing member 190 may be made of any suitable flexible and resilient material, such as rubber or polymer materials including thermoplastic elastomer (TPE) or thermoplastic vulcanate (TPV) types of materials. Preferably, sealing member 190 is made of a material which is UV stable, chemically inert, flexible so as to form around an entering drop line, tear resistant and moderately compression-set resistant.

In other embodiments, sealing member 190 may be integrally formed with strain relief bracket 180, or multiple sealing members 190 may be provided. For example, sealing members 190 may be flexible grommets in each opening 182. Such grommets may be either fixed within openings 182 or removable from openings 182. Alternately, sealing members 190 may comprise tape wrapped about the drop line to a diameter sufficient to fit securely within opening 182.

In one embodiment according to the invention, terminal 10 includes a memory device 200 mounted to the terminal for storing information about the terminal. In FIG. 3, memory device 200 is shown positioned within lid 78 of terminal housing 14. However, as will become evident, memory device 200 may be positioned anywhere on the interior or exterior of terminal 10. The memory device 200 is configured to interact with an electronic article surveillance system ("EAS"), such that a user of the EAS system may obtain information about the terminal. The information stored in the memory device may include, for example, the terminal location, terminal owner identification, terminal installation date, service provider identification, telecommunication cable types, splice types, connector types, and numbers of connectors available for use, to name a few. This information can be obtained by electronically interrogating memory device 200, either intermittently or continuously.

In one embodiment, the EAS system is a radio frequency identification ("RFID") system, and memory device 200 is an RFID device responsive to a radio frequency interrogation signal. The term "responsive" means, in the context of the present invention, that memory device 200 provides intelligible information when subjected to an appropriate interrogation field.

RFID devices can either be active or passive. An active device incorporates an additional energy source, such as a battery, into the device construction. This energy source permits active RFID devices to create and transmit strong response signals even in regions where the interrogating radio frequency field is weak, and thus an active RFID device can be detected at greater range. However, the relatively short lifetime of the battery can limit the useful life of the device. In addition, the battery adds to the size and cost of the device. A passive device derives the energy needed to power the device from the interrogating radio frequency field, and uses that energy to transmit response codes by modulating the impedance the antenna presents to the interrogating field, thereby modulating the signal reflected back to the reader antenna. Thus, their range is more limited. Because passive RFID devices are preferred for many applications, the remainder of the discussion will be confined to this class of RFID device. Those skilled in the art, however, will recognize that active, passive, and other RFID devices share many features and that each can be used with this invention.

As shown in FIG. 10A, a passive radio frequency-responsive element 210 (as may form memory device 200) typically includes two components: an integrated circuit 212 and an antenna 214. The integrated circuit 212 provides the primary identification function. It includes software and circuitry to permanently store the terminal identification and other desirable information, interpret and process commands received from the interrogation hardware, respond to requests for information by the interrogator, and assist the hardware in resolving conflicts resulting from multiple memory devices 200 responding to interrogation simultaneously. Optionally, the integrated circuit 212 may provide for updating the information stored in its memory (read/write) as opposed to just reading the information out (read only). Integrated circuits suitable for use in RFID markers include those available from Texas Instruments (in their TIRIS or Tag-it line of products), Philips (in their I-Code, Mifare and Hitag line of products), Motorola/Indala, and Single Chip Systems, among others.

The antenna 214 geometry and properties depend on the desired operating frequency of the RFID device. For example, 2.45 GHz (or similar) RFID devices may typically include a dipole antenna, such as the linear dipole antennas 214 shown in FIG. 10A, or the folded dipole antennas 214' shown attached to the radio frequency responsive element 10' in FIG. 10B. A 13.56 MHz (or similar) RFID device may use a spiral or coil antenna 214", as shown attached to the radio frequency responsive element 10" in FIG. 11.

The antenna 214 intercepts the radio frequency energy radiated by an interrogation source. This signal energy carries both power and commands to the memory device 200. The antenna 214 enables the RF-responsive element to absorb energy sufficient to power the IC chip and thereby provide the response to be detected. Thus, the characteristics of the antennas must be matched to the system in which it is incorporated. In the case of devices operating in the high MHz to GHz range, the most important characteristic is the antenna length. Typically, the effective length of a dipole antenna is selected so that it is close to a half wavelength or multiple half wavelength of the interrogation signal. In the case of RFID devices operating in the low to mid MHz region (13.56 MHz, for example) where a half wavelength antenna is impractical due to size limitations, the important characteristics are antenna inductance and the number of turns on the antenna coil. For both antenna types, good electrical conductivity is required. Typically, metals such as copper or aluminum would be used, but other conductors, including magnetic metals such as permalloy, are also acceptable. It is also important that the input impedance of the selected IC chip 212 match the impedance of the antenna 214 for maximum energy transfer. Additional information about antennas is known to those of ordinary skill in the art from, for example, reference texts such as J. D. Kraus, Antennas, (2d ed. 1988, McGraw-Hill, Inc., New York).

Figure 11:
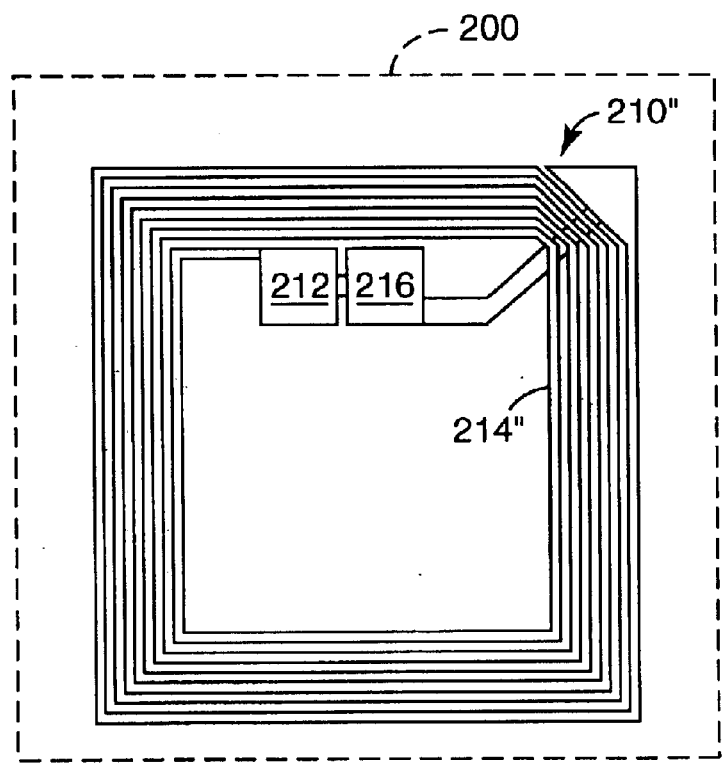
FIG. 11 is a schematic illustration of an alternate embodiment of a radio frequency identification device.

A capacitor 216 is often included to increase the performance of the RFID device, as shown in FIG. 11. The capacitor 216, when present, tunes the operating frequency of the device to a particular value. This is desirable for obtaining maximum operating range and insuring compliance with regulatory requirements. The capacitor 216 may either be a discrete component, or integrated into the antenna.

Figure 12:
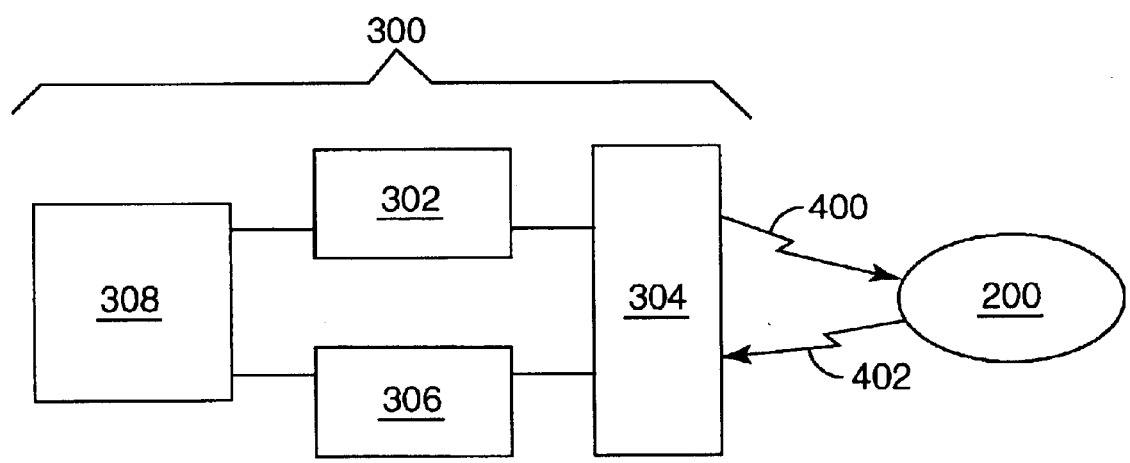
FIG. 12 is a block diagram of an RFID interrogation system interacting with an RFID memory device.

In operation, as shown in FIG. 12, the memory device 200 including radio frequency-responsive device 210 is interrogated by an EAS system 300, which is typically located near the point at which memory device 200 is to be monitored. Fixed or mobile interrogation devices may be used, with hand-held detection devices being preferred for use in the field. An interrogation source 302 (typically including a drive oscillator and an amplifier) is coupled to an antenna 304 (sometimes described as a field coil) for transmitting an alternating radio frequency field, or interrogation signal. The system 300 also includes an antenna for receiving a signal (shown as antenna 304, and sometimes described as a receiving coil) and detector 306 for processing signals produced by radio frequency responsive devices.

The interrogation source 302 transmits an interrogation signal 400, which may be selected within certain known frequency bands that are preferred because they do not interfere with other applications, and because they comply with applicable government regulations. When the radio frequency-responsive element 210 receives an interrogation signal 400 it transmits its own response code signal 402 that is received by the antennas 304 and transmitted to detector 306. The detector decodes the response, identifies the memory device (typically based on information stored in a computer or other memory device 308), and takes action based on the code signal detected. Various modifications of the illustrated system are known to those skilled in the art including, for example, using separate antennas for the interrogation source 302 and the detector 306 in place of the single antenna 304 that is illustrated.

Modem RFID devices also provide significant amounts of user accessible memory, sometimes in the form of read-only memory or write-only memory, but more preferably offering the user the ability to repeatedly update the memory by rewriting its contents from a distance. The amount of memory provided can vary, and influences the size and cost of the integrated circuit portion 112 of an RFID device. Typically, between 128 bits and 512 bits of total memory can be provided economically. For example an RFID device available from Texas Instruments of Dallas, Tex., under the designation "Tag-if" provides 256 bits of user programmable memory in addition to 128 bits of memory reserved for items such as the unique tag serial number, version and manufacturing information, and the like. Similarly, an RFID device available from Philips Semiconductors of Eindhoven, Netherlands, under the designation "I-Code" provides 384 bits of user memory along with an additional 128 bits reserved for the aforementioned type of information.

If information regarding the terminal is stored in the memory of the RFID device, then a suitable RFID reader can access and display that information very quickly. In other embodiments, the RFID device could simply transmit an identification code, which the RFID reader could use to access a database with information about the terminal correlated to that code.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the mechanical, optical, and opto-mechanical arts will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A terminal for a telecommunication cable having a plurality of telecommunication lines, the terminal comprising:
   a splice closure;
   a frame mounted within the splice closure, the frame including a first side, a second side oppose the first side, and a retention member for retaining non-spliced telecommunication lines of the telecommunication cable away from spliced telecommunication lines of the telecommunication cable within the splice closure, such that the spliced telecommunication lines are positioned adjacent the first side of the frame and the non-spliced telecommunication lines are retained adjacent the second side of the frame;
   a terminal closure joined to the splice closure; and
   a connection device within the terminal closure for establishing connection between the spliced telecommunication lines in the splice closure and a drop line.

2. The terminal of claim 1, wherein the telecommunication cable is a fiber optic cable having a plurality of optical fibers.

3. The terminal of claim 1, wherein the frame further comprises mounting brackets for attachment to the telecommunication cable.

4. The terminal of claim 1, further comprising a hanger secured to the splice closure for suspending the splice closure and terminal closure from a support cable.

5. The terminal of claim 1, wherein the connection device comprises a fiber optic connector for connection to fiber optic drop cables.

6. The terminal of claim 1, where in the connection device comprises a terminal block for connection to electrically conductive drop cables.

7. The terminal of claim 1, wherein the connection device comprises a splice.

8. The terminal of claim 7, wherein the splice is held in a splice tray.

9. The terminal of claim 1, further comprising a memory device mounted to the terminal for storing information about the terminal.

10. The terminal of claim 9, wherein the information about the terminal comprises at least one of terminal location, terminal owner identification, terminal installation date, service provider information, cable type, splice type, connector type, number of connectors available.

11. A terminal for a telecommunication cable having a plurality of telecommunication lines, the terminal comprising:
    a splice closure;
    a frame mounted within the splice closure, the frame having a retention member for retaining non-spliced telecommunication lines of the telecommunication cable away from spliced telecommunication lines of the telecommunication cable within the splice closure;
    a terminal closure joined to the splice closure; and
    a connection device within the terminal closure for establishing connection between the spliced telecommunication lines in the splice closure and a drop line;
    wherein the frame further comprises mounting brackets for attachment to the telecommunication cable, and
    wherein the mounting brackets further comprise strain relief members for attachment to a strength member of the telecommunication cable.

12. A terminal for a telecommunication cable having a plurality of telecommunication lines, the terminal comprising:
    a splice closure;
    a frame mounted within the splice closure, the frame having a retention member for retaining non-spliced telecommunication lines of the telecommunication cable away from spliced telecommunication lines of the telecommunication cable within the splice closure;
    a terminal closure joined to the splice closure;
    a connection device within the terminal closure for establishing connection between the spliced telecommunication lines in the splice closure and a drop line; and
    a splice tray having a communication line for connection to the spliced telecommunication lines of the telecommunication cable.

13. The terminal of claim 12, wherein the splice tray and spliced telecommunication lines are positioned adjacent the first side of the frame and the non-spliced telecommunication lines are retained adjacent the second side of the frame.

14. A terminal for a telecommunication cable having a plurality of telecommunication lines, the terminal comprising:
    a splice closure;
    a frame mounted within the splice closure, the frame having a retention member for retaining non-spliced telecommunication lines of the telecommunication cable away from spliced telecommunication lines of the telecommunication cable within the splice closure;
    a terminal closure joined to the splice closure; and
    a connection device within the terminal closure for establishing connection between the spliced telecommunication lines in the splice closure and a drop line;
    wherein the frame further comprises an isolation port for directing the spliced telecommunication lines to a first side of the frame and the non-spliced telecommunication lines to a second side of the frame.

15. A terminal for a telecommunication cable having a plurality of telecommunication lines, the terminal comprising:
    a splice closure for enclosing spliced telecommunication lines in a telecommunication cable;
    a terminal closure joined to the splice closure;
    a connection device within the terminal closure for connection between the spliced telecommunication lines in the splice closure and a drop line extending outside of the terminal closure;
    a storage member within the terminal closure for retaining excess lengths of the drop line; and
    a strain relief bracket within the terminal closure for connection to the drop line.

16. The terminal of claim 15, wherein the terminal closure further comprises a sealing member surrounding the drop line extending outside of the terminal closure.

17. The terminal of claim 16, wherein the sealing member is integral with the strain relief bracket.

18. The terminal of claim 15, wherein the strain relief bracket further comprises a first strain relief member for attachment to an exterior sheath of the drop line.

19. The terminal of claim 18, wherein the strain relief bracket further comprises a second strain relief member for attachment to a strength member of the drop line.

20. The terminal of claim 15, wherein the storage member comprises at least one reclosable fastener.

21. The terminal of claim 15, wherein the storage member comprises an enclosable tray.

22. The terminal of claim 21, wherein the enclosable tray comprises:
   a first storage area for retaining excess lengths of the drop line;
   a second storage area for retaining excess lengths of a communication line extending between the splice closure and the terminal closure; and
   a third storage area for retaining the connection device.

23. The terminal of claim 15, wherein the storage member comprises a movable storage platform.

24. The terminal of claim 23, wherein the movable storage platform separates excess lengths of the drop line from the connection device.

25. The terminal of claim 15, wherein the telecommunication cable is a fiber optic cable having a plurality of optical fibers.

26. The terminal of claim 25, wherein the connection device comprises a patch panel having a plurality of connectors.

27. The terminal of claim 26, wherein the patch panel is securable to prevent access to back sides of the plurality of connectors.

28. The terminal of claim 26, further comprising at least one drainage hole in the patch panel.

29. The terminal of claim 26, wherein surfaces of the patch panel are hydrophobic.

30. The terminal of claim 15, further comprising a memory device mounted to the terminal for storing information about the terminal.

31. The terminal of claim 30, wherein the information about the terminal comprises at least one of terminal location, terminal owner identification, terminal installation date, service provider identification, cable type, splice type, connector type, number of connectors available.

32. A terminal for a telecommunication cable, the terminal comprising:
   a splice closure for enclosing splices in a telecommunication cable;
   a terminal closure secured to the splice closure;
   at least one connection device for connection between the telecommunication cable in the splice closure and drop lines; and
   a memory device mounted to the terminal for storing information about the terminal, wherein the memory device is configured to interact with an electronic article surveillance system.

33. The terminal of claim 32, wherein the information about the terminal comprises at least one of terminal identification code, terminal location, terminal owner identification, terminal installation date, service provider information, cable type, splice type, connector type, and number of connectors available.

34. A terminal for a telecommunication cable, the terminal comprising:
   a splice closure for enclosing splices in a telecommunication cable;
   a terminal closure secured to the splice closure;
   at least one connection device for connection between the telecommunication cable in the splice closure and drop lines; and
   a memory device mounted to the terminal for storing information about the terminal, wherein the memory device is radio frequency responsive.

35. The terminal of claim 34, wherein the memory device is responsive to an RFID interrogation system.

36. The terminal of claim 35, wherein the memory device is adapted to transfer information stored in the memory device to the RFID interrogation system.

37. The terminal of claim 35, wherein the memory device is adapted to receive and store information from the RFID interrogation system.

38. The terminal of claim 34, wherein the information about the terminal comprises at least one of terminal identification code, terminal location, terminal owner identification, terminal installation date, service provider information, cable type, splice type, connector type, and number of connectors available.

* * * * *

UNITED STATES PATENT AND TRADEMARK OFFICE
CERTIFICATE OF CORRECTION

PATENT NO. : 6,777,617 B2  
DATED : August 17, 2004  
INVENTOR(S) : Berglund, Sidney J.

It is certified that error appears in the above-identified patent and that said Letters Patent is hereby corrected as shown below:

Column 10,
Line 40, delete "Modem" and insert -- Modern -- therefore
Line 50, delete "Tag-if" and insert -- Tag-it -- therefore Signed and Sealed this Nineteenth Day of April, 2005

JON W. DUDAS
*Director of the United States Patent and Trademark Office*